United States Patent
Smith

(10) Patent No.: US 10,036,165 B1
(45) Date of Patent: Jul. 31, 2018

(54) CONTINUOUS GLASS FIBER REINFORCEMENT FOR CONCRETE CONTAINMENT CAGES

(71) Applicant: Global Energy Sciences, LLC, Pompano Beach, FL (US)

(72) Inventor: Donald R. Smith, Pompano Beach, FL (US)

(73) Assignee: Global Energy Sciences, LLC, Pompano Beach, FL (US)

(*) Notice: Subject to any disclaimer, the term of this patent is extended or adjusted under 35 U.S.C. 154(b) by 0 days.

(21) Appl. No.: 15/877,119

(22) Filed: Jan. 22, 2018

Related U.S. Application Data

(63) Continuation-in-part of application No. 15/068,198, filed on Mar. 11, 2016, now Pat. No. 9,874,015.

(60) Provisional application No. 62/131,889, filed on Mar. 12, 2015.

(51) Int. Cl.
| | | |
|---|---|---|
| *E04C 5/07* | (2006.01) | |
| *E04C 5/06* | (2006.01) | |
| *B28B 23/22* | (2006.01) | |
| *B28B 23/18* | (2006.01) | |
| *E04C 3/20* | (2006.01) | |
| *E04C 3/34* | (2006.01) | |

(52) U.S. Cl.
CPC .............. *E04C 5/073* (2013.01); *B28B 23/18* (2013.01); *B28B 23/22* (2013.01); *E04C 5/06* (2013.01); *E04C 3/20* (2013.01); *E04C 3/34* (2013.01)

(58) Field of Classification Search
CPC ............ E04C 5/073; E04C 3/20; B28B 23/18
See application file for complete search history.

(56) References Cited

U.S. PATENT DOCUMENTS

| | | | |
|---|---|---|---|
| 3,523,853 A | | 4/1970 | Thomas |
| 4,304,376 A | | 12/1981 | Hilton |
| 4,643,933 A | | 2/1987 | Picken |
| 5,580,642 A | * | 12/1996 | Okamoto ................. E04C 5/07 428/212 |
| 5,873,207 A | * | 2/1999 | Bertels .................. E01F 8/0023 52/250 |
| 6,263,629 B1 | * | 7/2001 | Brown, Jr. .............. E04C 2/044 442/179 |
| 6,389,775 B1 | * | 5/2002 | Steiner ................ E04G 23/0218 52/600 |
| 6,558,777 B2 | | 5/2003 | Yoshii |
| 6,720,060 B1 | | 4/2004 | Swars |
| 8,424,805 B2 | | 4/2013 | Smith |
| 9,874,015 B2 | | 1/2018 | Smith |
| 2004/0065044 A1 | | 4/2004 | Bleibler |
| 2006/0014878 A1 | | 1/2006 | Van Erp |

(Continued)

FOREIGN PATENT DOCUMENTS

EP 0296598 12/1988

*Primary Examiner* — Gisele D Ford
(74) *Attorney, Agent, or Firm* — McHale & Slavin, P.A.

(57) ABSTRACT

Matrix basalt reinforcing member constructed and arrange to provide lateral support for the longitudinal bar steel or FRP tendons that provide tensile strength to cementitious material or plastics to reduce bending moment by reducing the onset of shear. The reinforcement members are formed from continuous glass fibers treated with a thermoplastic thermoset polymer and formed into structures to provide structural resistance to bending-moment forces, compression forces, and torsional forces acting on the structure.

5 Claims, 5 Drawing Sheets

(56) References Cited

U.S. PATENT DOCUMENTS

| | | |
|---|---|---|
| 2008/0141614 A1* | 6/2008 | Knouff .................. B29C 53/14 |
| | | 52/857 |
| 2010/0065044 A1 | 3/2010 | Reader et al. |
| 2012/0066994 A1* | 3/2012 | Gibson .................. B29C 70/52 |
| | | 52/309.13 |
| 2012/0110940 A1 | 5/2012 | Hemphill |
| 2013/0239503 A1 | 9/2013 | Miller et al. |
| 2014/0099456 A1 | 4/2014 | Raghavendran et al. |
| 2015/0050440 A1 | 2/2015 | Albers et al. |

* cited by examiner

CONTINUOUS GLASS FIBER REINFORCEMENT FOR CONCRETE CONTAINMENT CAGES

PRIORITY CLAIM

In accordance with 37 C.F.R. 1.76, a claim of priority is included in an Application Data Sheet filed concurrently herewith. Accordingly, the present invention claims priority as a continuation-in-part of U.S. patent application Ser. No. 15/068,198, entitled "BASALT REINFORCEMENT FOR CONCRETE CONTAINMENT CAGES", filed Mar. 11, 2016, which claims priority to U.S. Provisional Patent Application No. 62/131,889, entitled "BASALT REINFORCEMENT FOR CONCRETE CONTAINMENT CAGES", filed Mar. 12, 2015. The contents of the above referenced applications are incorporated herein by reference.

FIELD OF THE INVENTION

This invention relates broadly to concrete reinforcement, and more particularly, to reinforcement members made from continuous fiber glass in a configuration to improve tensioning in concrete and reinforced masonry structures.

BACKGROUND OF THE INVENTION

Concrete is very strong in compression, but relatively weak in tension. To compensate for this imbalance in concrete's behavior, reinforcement bars (rebar) are cast into the concrete to carry the tensile structural load. Rebar has been commonly used for reinforcement as the coefficient of thermal expansion. When reinforced concretes freezes or gets hot, the two materials contract and expand similarly. In addition, the bond between reinforcing steel bars and concrete is strong; steel typically includes surface deformations to further improve that bond. Due to the strong bond, the concrete effectively transfers stresses to the steel and vice versa.

Other non-metal reinforcement bar is known in the art, including the use of non-continuous fiberglass, aramid fibers such as Kevlar, Tarwon, and carbon fiber. However, non-continuous fiberglass can be porous and lead to a weakening of concrete by allowing water transfer. In addition, the elongation to break off fiberglass is excessive high and aramids and carbon fiber are cost prohibitive.

More recently, reinforcement bar produced from continuous basalt fiber has been found to be superior to steel in both pervious and non-pervious concrete. The Applicant, Raw Energy Materials of Pompano Beach Fla., is a manufacture of basalt reinforcement bar marked under the trade name RockRebar™, RockMesh™, RockStirrups™ and RockDNA™ that is placed within concrete, including pervious concrete.

Disclosed is alternative non-metal concrete reinforcement products that provide lateral containment and support for the longitudinal bar steel that provide tensile strength to cementitious material or plastics to reduce bending moment by reducing the onset of shear.

SUMMARY OF THE INVENTION

In light of the above and according to one aspect of the invention, disclosed herein is a continuous glass fibers, such as basalt, for use in reinforcement to form improved concrete structures that can be used to make roads, sidewalks and other pavements or infrastructures. In a preferred embodiment, the invention utilizes a basalt reinforcing member that provides lateral support for the longitudinal bar steel or FRP tendons that provides tensile strength to cementitious material or plastics to reduce bending moment by reducing the onset of shear. Disclosed are the use of alternative continuous glass fibers to basalt selected from the group consisting of borosilicate based glass, volcanic basalt glass, and carbon fiber.

The extremely low stretch and cyclical tenacity of continuous basalt fiber is exploited to produce a reinforcing member specifically formed to provide tension support for pervious concrete. The reinforcing members produced using continuous basalt fibers (CBF) in an appropriate adhesive matrix be it a thermo plastic or a thermo set epoxy, vinyl ester or urethane add structural rigidity to the pervious concrete, making the concrete capable of supporting heavy loads. The CBF reinforcing members are formed from multiple roving (bundles) to produce the required strength for the load predictions in a similar manner to steel calculations. The micron size of the basalt fiber and the size of the CBF roving may be altered as necessary.

In particular, formation of corners, stirrups, hoops or cages which are typically performed by bending of metal rebar, or in the case of Fiber Reinforced Polymer (FRP) bending sections of pultruded FRP before it is heat cured. The use of a formed hoop is to stabilize the placement of longitudinal reinforcement within cementus elements such as Portland based concrete during the pour. Additionally lateral containment of the longitudinal reinforcement within concrete delays the onset of shear during a bending moment that could otherwise fail the inherently low tensile strength of unreinforced concrete by dissipating tension or compression laterally thus inherently reducing pressure concentration that could otherwise fail the inherently low tensile strength of unreinforced concrete streets, walls, panels, beams or columns.

Concrete containment formed by bending steel rebar into rectilinear hoops is often referred to as "stirrups. The smallest bend radius of stirrups is limited to prevent the onset of metal fracture. In most instances having a larger bend radius is desirable since the bending is known to reduce corner strength to 40-50% of the rebar's original strength. It has been identified that the ultimate load capacity of a steel or fiber reinforced polymer concrete beam, column, panel or street is limited by the rupture strength of the stirrups to delay the onset of shear within the concrete. Continuous basalt fiber can be layered upon itself to form uniformly loaded belts of high tensile reinforcement. Additionally, the tenacious nature of filament winding FRP materials such as Basalt FRP can allow for much tighter radius in corners than possible with traditional bending of concrete reinforcements. In any case the manufacturing process of the reinforcement fibers is continuous and without cold secondary bonds of basalt fiber with the adhesive matrix. The basalt reinforcing members are made of continuous basalt fiber strands combined with non-corrosive thermo set or thermo plastic polymer formed into a hoop shape that, when placed within concrete, adds structural rigidity to the concrete wherein the concrete is capable of supporting loads as normally experienced on pavements. One enhancement of using continuous basalt fiber is that in the event of catastrophic overload, cracks in the cementious material employing continuous basalt fiber reinforcement does not exhibit memory of the event and the continuous basalt fiber reinforced concrete construction tends to return to their original condition.

Continuous basalt fiber is manufactured from basalt filaments made by melting of crushed volcanic rock of a specific mineral mixture known as a breed and drawing the molten material into fibers. The fibers cool to form hexagonal chains resulting in a resilient structure having a substantially higher tensile strength than steel of the same diameter at one fifth the weight and virtually corrosion free.

An objective of this invention is to disclose a hoop construction and method of making wherein the hoop is composed of filament wound basalt fibers in a polymer matrix. A principal advantage is the non-rusting nature of composite structure which allows the reinforcement cage to be placed close to the outside of the bend radius of the concrete member and being reinforced without fear of rust degradation from insufficient concrete coverage.

Another objective of the invention is to provide a continuous basalt fiber material hoop configuration that is an economical and sustainable alternative to steel and fiberglass rebar, mesh or staple for concrete reinforcement having an expansion ratio similar to the concrete.

Still another objective of the invention is to provide a continuous basalt fiber material hoop configuration that addresses corner weakness in FRP cage reinforcement and a non-rusting alternative to steel stirrups.

Another objective of the invention is to provide concrete reinforcement with a material that does not absorb moisture or operate to wick water into the concrete.

Still another objective of the invention is to provide a basalt material for use in corner designs by providing reinforcement to the concrete next to the corner of the concrete material.

Still another objective of the invention is to provide a continuous basalt fiber configuration that is stronger than steel, yet lighter than steel rebar making installation simpler and less stressful on the workers.

Yet still another objective of the instant invention is to provide a basalt matrix configuration that allows for the reduction in the diameter of rebar sizes employed, as compared to steel rebar, thereby reducing shipping costs and logistics issues while reducing sheer within a concrete matrix.

Another objective of the invention is to provide a concrete reinforcement matrix of basalt rebar having the same thermal coefficient of expansion as concrete and is inherently resistant to corrosion, rust, alkali, and acids.

Yet another objective of the invention is to provide basalt reinforcement that can be used as an alternative for steel reinforcement in most every construction including, but not limited to, highways, roads, highway noise embankment walls, sea wall caps, and swimming pool cages.

Yet another objective of the invention is to provide a method of providing basalt fiber reinforcement for applications in which deflection is not an issue and the concrete must resist freeze thaw cracking and or corrosion elimination such as with bridge decks and arched tunnel linings.

Another objective of the invention is to provide a concrete reinforcement matrix that does not conduct electricity and will not create a path for water to penetrate through concrete.

Another objective of the invention is to provide a concrete reinforcement matrix that does not allow the creation of magnetic fields.

Another objective of the invention is to provide a concrete reinforcement matrix that does not absorb radiation.

Another objective of the invention is to eliminate radar reflection and the blockable of radio, microwave or degrade thermo scans results.

Yet another objective of the invention is to extent the service limits of thermal load limits of a concrete structure.

Yet still another objective of the invention is to enhance the cyclical tenacity of a concrete structure in a seismic event.

Yet still another objective of the invention is to provide a concrete reinforcement matrix that can be cut with a conventional saw or with common tools.

Other objectives and further advantages and benefits associated with the basalt rebar matrix will be apparent to those skilled in the art from the description, examples and claims which follow.

DETAILED DESCRIPTION OF THE PREFERRED EMBODIMENT

Disclosed herein is an improved reinforcement matrix member for concrete structures or reinforced pavements. Specifically, the matrix member works with concrete material by forming a structural support use in reinforcing concrete structures, pavements, roads, sidewalks and other infrastructure conventionally reinforced with rebar. Through the use of embodiments of the present invention, the concrete structure can be made stronger by adopting the high tensile, low stretch characteristics of continuous basalt fiber configured into a geometry that acts to tighten to the concrete it reinforces as load increases. The material and method of construction extends the onset of bond slit to beyond the limits of the concrete matrix it reinforces resulting in a somewhat self-healing structure where the lack of memory after a temporary overload will allow the structure to return to its original shape. In particular, the continuous glass fibers are formed into rectilinear shape with corners form fit to the longitudinal reinforcement by layering filaments atop each other in a manner that subsequently enhances the catenary (balance of load between fibers) within the reinforcement invention resulting in corner strength in excess of currant stirrup reinforcements of steel or FRP allowing for improved stirrup containment.

In the preferred embodiment basalt is used as the continuous glass fiber. Basalt is a non toxic naturally occurring volcanic rock that when processed into continuous glassy fibers subsequently bundled into rovings that may be cold formed into shaped reinforcement with a variety of benefits when compared to steel rebar typically used for reinforced concrete. Basalt is a naturally occurring rock which means it can resist rust or develop any type of corrosion and does not absorb any amount of water. Basalt rebar is also about ¼ of the weight of steel rebar, which makes basalt rebar much easier to transport and assemble on the job site. Also, basalt rebar can be easily cut using common tools in the field.

Basalt can out perform concrete 10:1 in compression strength and 100:1 in tension strength. The configuration of the instant invention is designed to address expansion and contraction as well as creep and fatigue. When used with pervious concrete, that is, pavement that permits water and air to pass, the use of the basalt for reinforcement eliminates the rusting problem commonly associated with steel rebar. Alternative continuous glass fibers include borosilicate based glass, volcanic basalt glass and carbon fiber.

Figure 1:
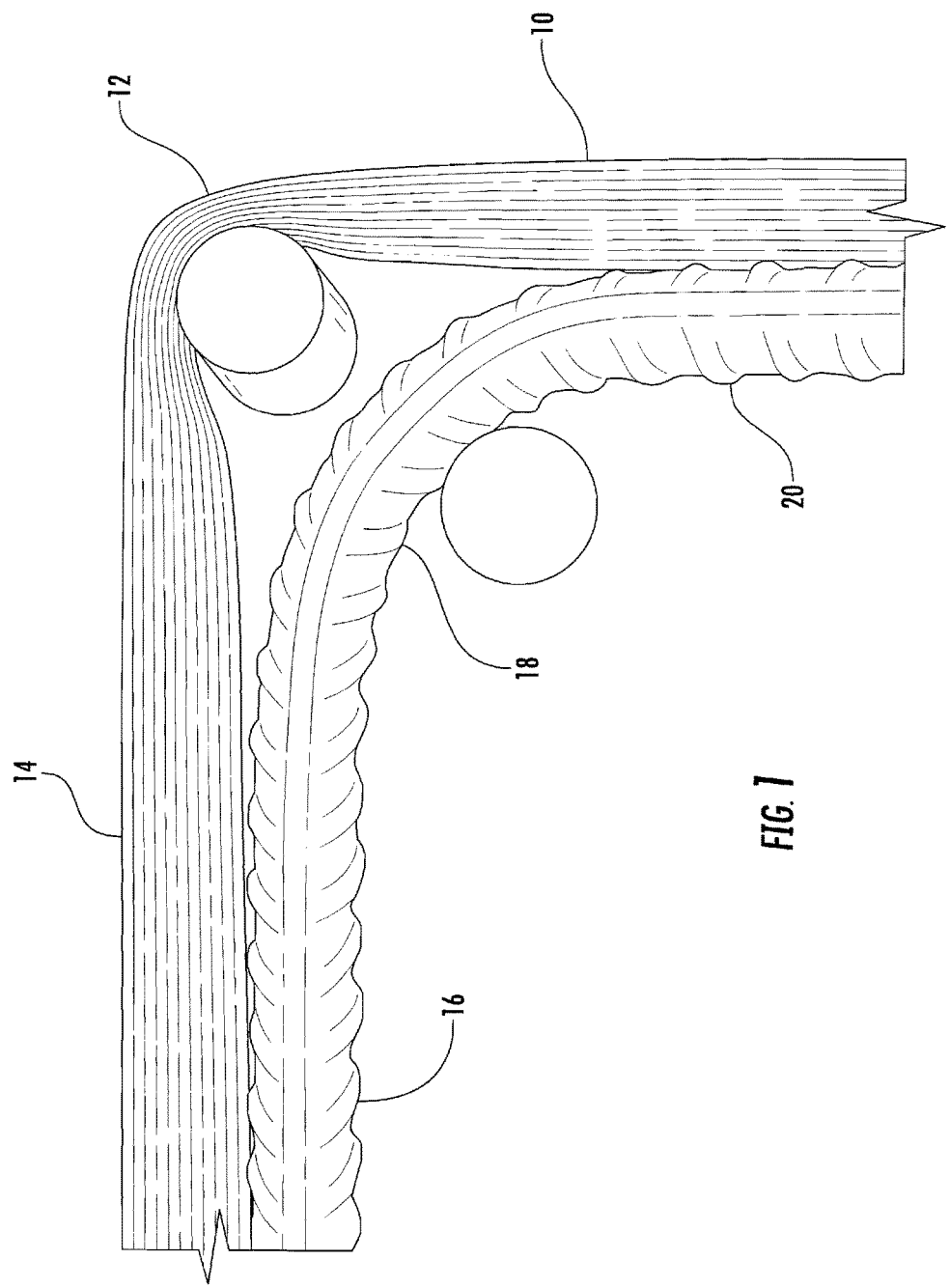
FIG. 1 is a pictorial view of a basalt fiber hook compared to a steel rebar hook.

FIG. 1 is a pictorial view of a basalt fiber roving into a hook shape as depicted by a first extension 10 leading to a substantially 90 degree angle along corner 12. The second extension 14 continuing outwardly from the corner 12. It should be obvious to one skilled in the art that the formation of the basalt into a substantially right angle allows the placement of the basalt rebar into a position much closer to the corner of a concrete structure providing an improvement reinforcement to the corner. By way of comparison, a steel rebar 16 used in forming a right corner is bent to form a corner 18 before continuing to the length 20. The bending of the steel eliminates the ability to form a proper 90 degree or right angle corner resulting in a rounded corner. The rounded corner does not allow for concrete reinforcement near the corner of the overlying concrete resulting in an area of concrete that does not have tension reinforcement. The continuous basalt fibers are woven within a thermoplastic of a thermoset polymer selected from the group of as urethane, polyester, vinyl ester, epoxy, phenolic, polyimide, polyamide, polypropylene, PEEK, methacrylate, or a combination thereof. A principal advantage is in the non-rusting nature of the hoops composite structure allowing the tensile elements of the reinforcement cage to be place close the outside of the bend radius of the concrete member being reinforced without fear of rust degradation from insufficient concrete coverage.

Stirrups for beam cages are produced by filament winding continuous basalt layer by layer resulting in fully 360 degrees enclosing hoops composed of more evenly loaded fiber tendons. The use of basalt reduces the considerations over inadequate coverage to resist concrete spalling due to rusting steel, the basalt offers weight reduction and dimensional consistency of adopting filament wound hoops. The strength of a basalt hoop may be controlled during the winding process simply by filament count. It should be noticed that compared to a conventionally formed stirrup, the basalt member fits more concisely around the corner.

Figure 2:
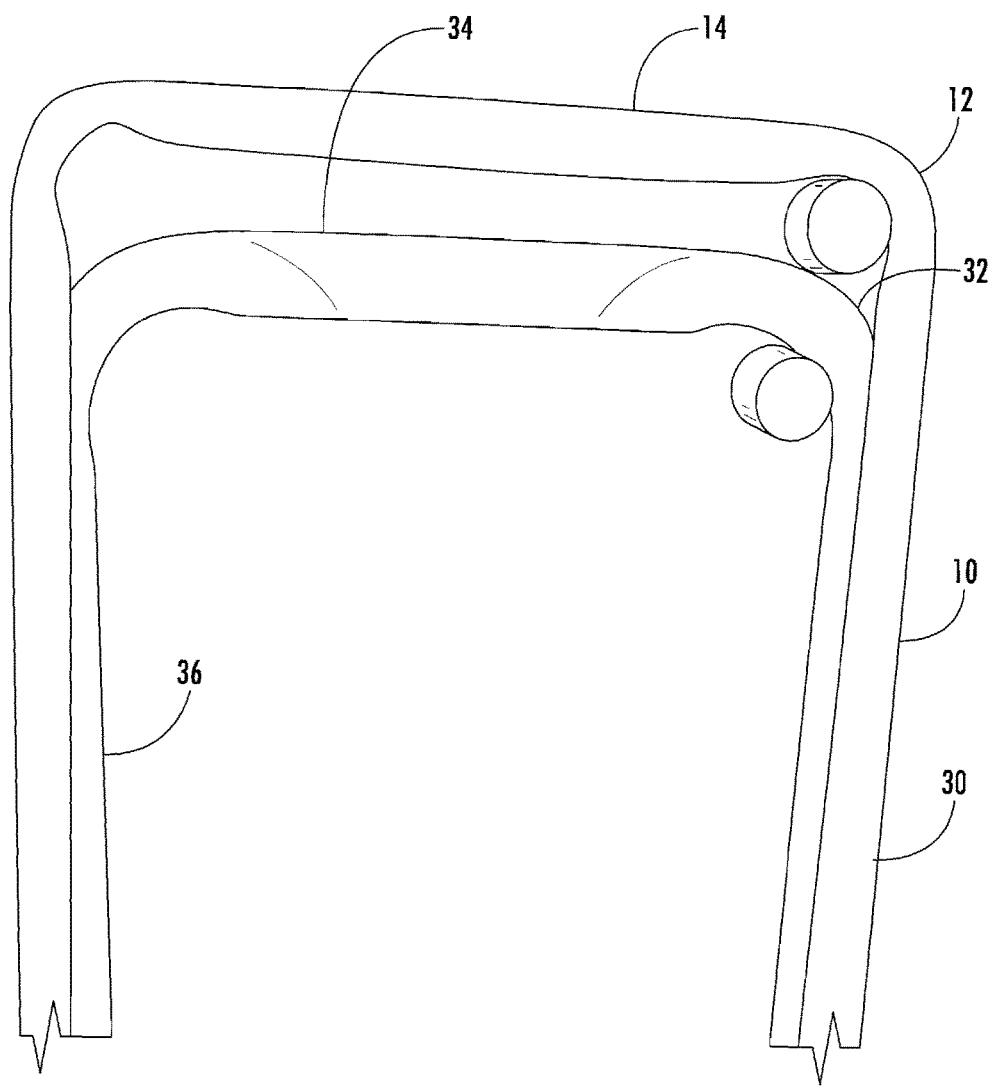
FIG. 2 is a pictorial view of two basalt fiber hooks.

FIG. 2 is a pictorial view illustrating the ability to nest multiple bundles to further enhance corner edge concrete structures. In this embodiment, a first basalt rebar includes a first extension leg 10 leading to a second extension leg 14 once formed along a ninety degree angle 12. Similarly, a second basalt rebar includes a second extension leg 30 leading to a second extension leg 34 once formed along a ninety degree angle 32. It is noticed that the formation of the basalt rebar allows for the angle without the need to bend the material, as required with the rebar. It should also be understood that the cold bending of any steel affects the structure and can quickly degrade any coating that may be been placed over the steel.

Figure 3:
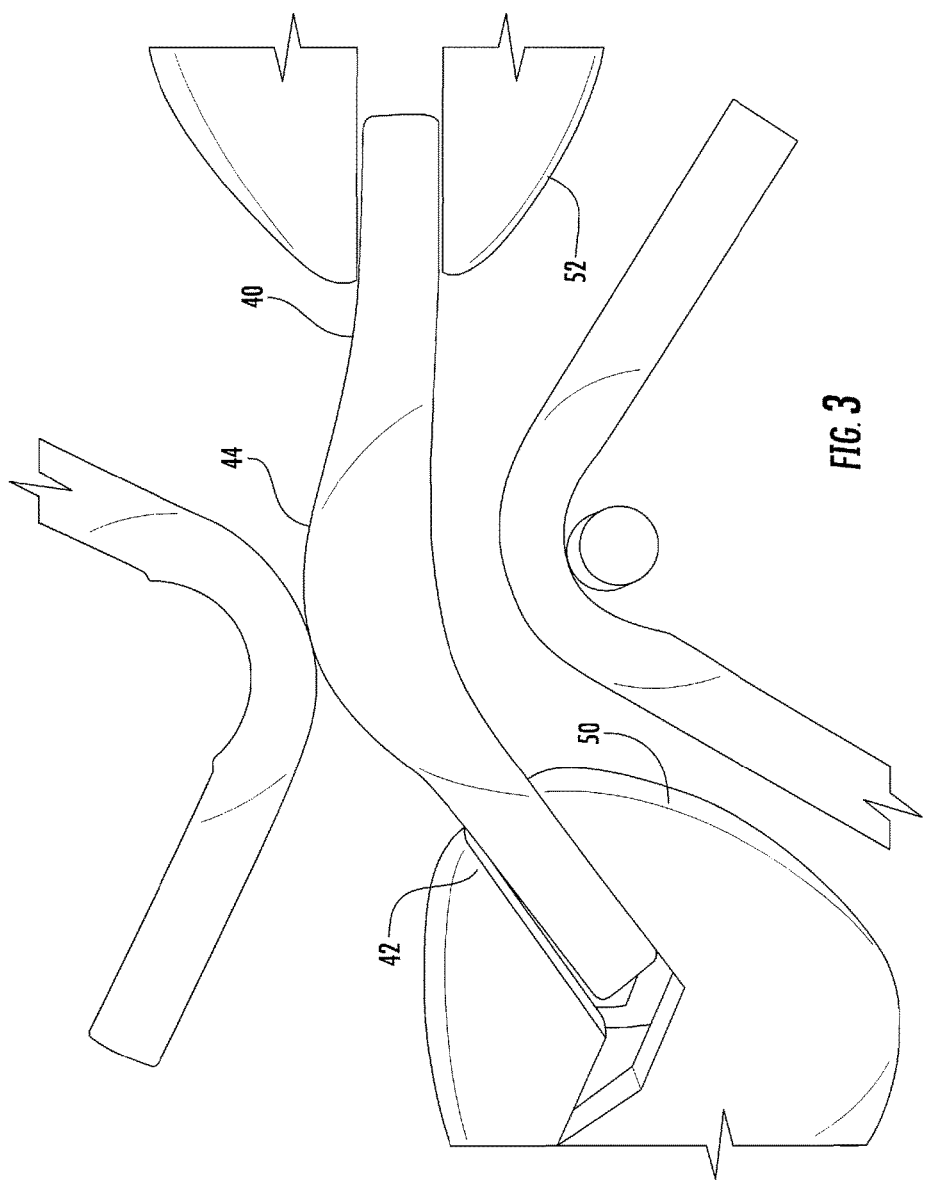
FIG. 3 is a pictorial view of a basalt fiber hook strained to reveal fibers.

FIG. 3 depicts a basalt rebar in a straightened format where the first extension 40 is placed substantially parallel to the second extension 42 causing the corner fibers 44 to propagate outward. This illustrates that the corner was specifically made in the 90 degree angle and the fibers are rejecting the straightening of the rebar. The rebar is placed into the straightened position by wrenches 50, 52. Placing longitudinal tinsel tendons of low elongation to break out further on the bend radius tends to reduce deflection of the element being reinforced. With steel reinforcement, the limiting factor has been to provide sufficient cover over the steel to protect it from moisture penetration of the cementus material and subsequent rusting resulting in spalling of the concrete and reduced life cycle of the structure.

Figure 4:
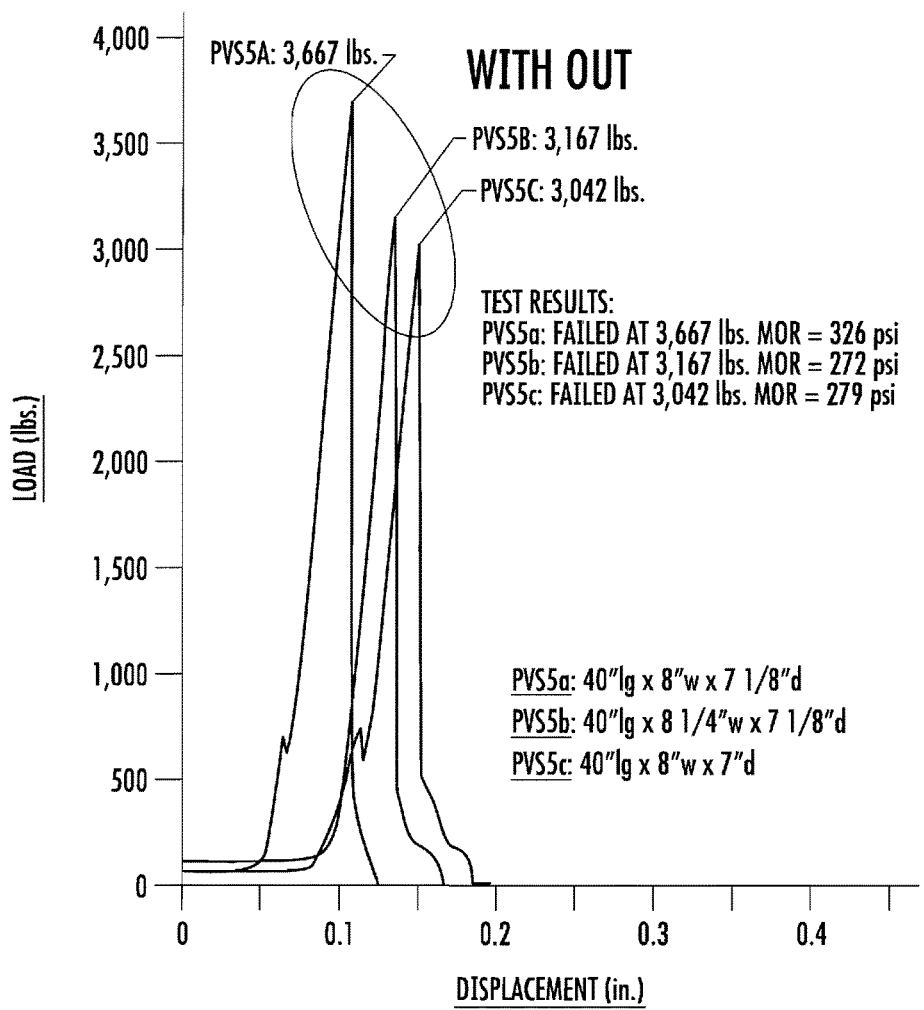
FIG. 4 is a pervious concrete load versus displacement test without use of basalt rebar.
Figure 5:
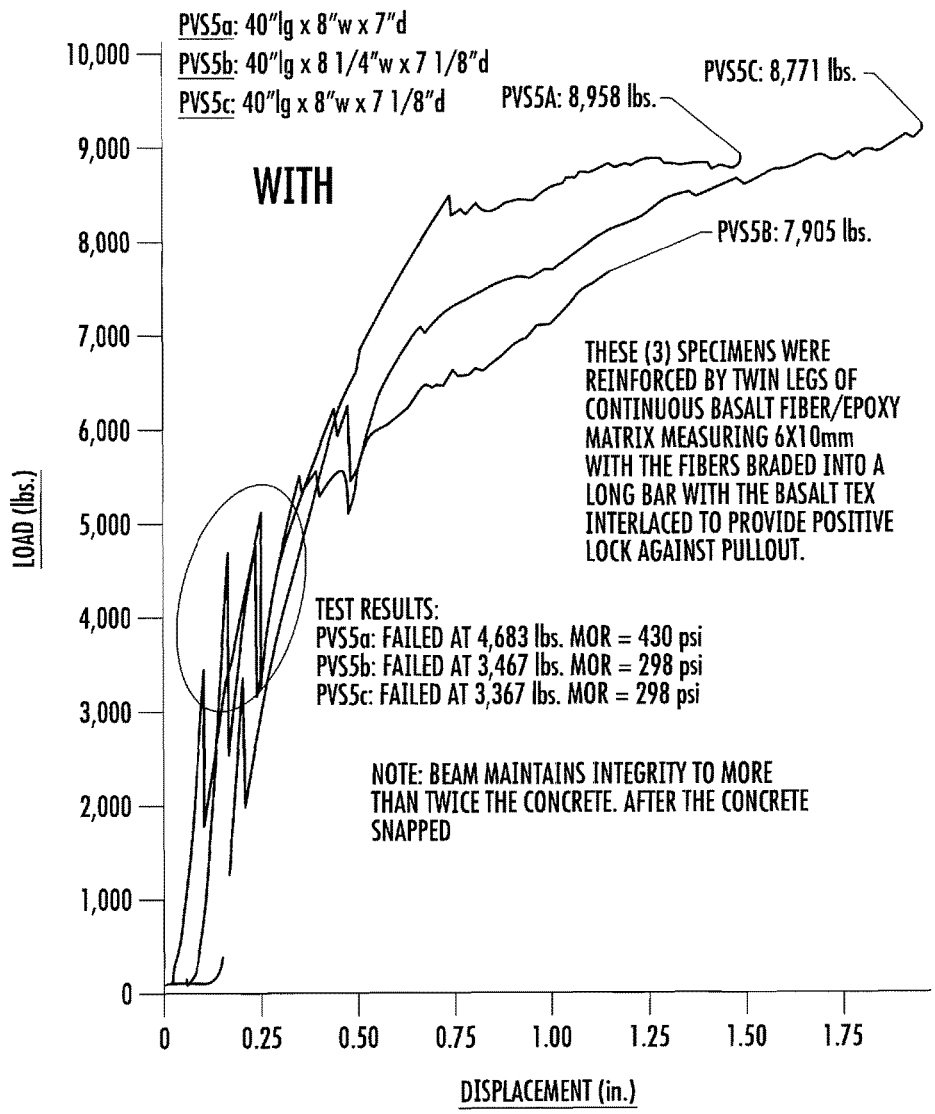
FIG. 5 is a pervious concrete load versus displacement test with use of basalt rebar.

FIG. 4 is a chart indicating pervious concrete beam failures without the instant invention, the load on the beam indicates a failure of 3042 lbs, 3167 lbs and 3667 lbs. FIG. 5 is a chart indicating pervious concrete beam failures that were reinforced by twin legs of continuous basalt fiber/ epoxy matrix measuring 6×10 mm with the fibers braded into a long bar with the basalt tex interlaced to provide positive lock against pullout. The failure now improved to 7905 lbs, 8771 lbs, and 8958 lbs. The beams were made from a standard mix with polymer without sand.

The shear behavior of concrete beams reinforced with the basalt hoops, as opposed to steel stirrups, will show reduced handling fatigue and better consistency during cage construction. The design tensile strength for a FRP (fiber reinforced polymer) reinforced concrete element cannot be greater than the strength of the bend in the stirrup which is typically 40 to 50% less than that of a straight bar.

The method of concrete reinforcement comprising the steps of selecting a plurality of individual continuous length basalt fiber strands and forming a bundle of basalt fiber strands; wrapping said bundle of basalt fiber strands around at least one peg to form a 90 degree bend radius; treating said wrapped bundle of basalt fiber strands with a thermoplastic thermoset polymer selected from the group of: urethane, polyester, vinyl ester, epoxy, phenolic, polyimide, polyamide, polypropylene, PEEK, methacrylate or a combination thereof and allowing said thermoplastic thermoset polymer to cure into a basalt bar; and embedding said basalt bar into concrete to improve tensioning in the corners of the concrete. The individual fiber strands within the bundle are positioned closer to the peg and have a length less than individual fiber strands that are positioned further from the peg.

The deflection of beam or panels can be controlled by increasing the area of basalt bar tension reinforcement. To reduce deflection by adding basalt bar installed out closer to the surface of the bend radius thereby increasing the leverage of the reinforcement on the bending moment would take advantage of the basalts higher tensile and lower stretch as compared to that fiberglass reinforcement.

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/ figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope.

Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of concrete reinforcement comprising the steps of:
   selecting a plurality of individual continuous length continuous glass fiber strands and forming a bundle of continuous glass fiber strands;
   wrapping each said bundle of continuous glass fiber strands around a 90 degree bend radius wherein continuous glass fiber strands positioned along an inner edge of said radius have a length less than continuous glass bundle fiber strands positioned along an outer edge of said radius;
   treating said wrapped bundle of continuous glass fiber strands with a thermoplastic thermoset polymer selected from the group of: urethane, polyester, vinyl ester, epoxy, phenolic, polyimide, polyamide, polypropylene, PEEK, methacrylate or a combination thereof;
   allowing said thermoplastic thermoset polymer to cure into a rigid bar;
   embedding said rigid bar into liquid concrete near a corner wherein said rigid bar improves tensioning the corner of the concrete.

2. The method of concrete reinforcement according to claim 1 wherein said bar embedded in the corner of concrete further is positioned close to the surface of the concrete thereby reducing deflection in the concrete and increasing the leverage of reinforcement on the bending moment in the concrete.

3. The method of concrete reinforcement according to claim 1 wherein said concrete is porous.

4. The method of concrete reinforcement according to claim 1 wherein said bar is constructed and arranged to have an expansion ratio similar to an expansion ratio of the concrete.

5. The method of concrete reinforcement according to claim 1 wherein said continuous glass fibers are selected from the group consisting of basalt, borosilicate based glass, volcanic basalt glass, and carbon fiber.

* * * * *